United States Patent
Sieracki et al.

(10) Patent No.: US 10,761,007 B2
(45) Date of Patent: Sep. 1, 2020

(54) SYSTEM AND METHOD FOR LIGHT OBSCURATION ENHANCED IMAGING FLOW CYTOMETRY

(71) Applicant: Fluid Imaging Technologies, Inc., Scarborough, ME (US)

(72) Inventors: Christian K. Sieracki, Edgecomb, ME (US); Kent A. Peterson, Cape Elizabeth, ME (US); Axel Wilde, Essen (DE)

(73) Assignee: Yokogawa Fluid Imaging Technologies, Inc., Scarborough, ME (US)

( * ) Notice: Subject to any disclaimer, the term of this patent is extended or adjusted under 35 U.S.C. 154(b) by 0 days.

(21) Appl. No.: 15/994,258

(22) Filed: May 31, 2018

(65) Prior Publication Data

US 2019/0368998 A1 Dec. 5, 2019

(51) Int. Cl.
*G01N 15/14* (2006.01)
*G01N 21/64* (2006.01)
*G01N 21/53* (2006.01)
*G01N 15/02* (2006.01)

(52) U.S. Cl.
CPC ..... *G01N 15/1404* (2013.01); *G01N 15/0227* (2013.01); *G01N 21/532* (2013.01); *G01N 21/64* (2013.01); *G01N 2015/1402* (2013.01)

(58) Field of Classification Search
CPC .......... G01N 15/1404; G01N 15/0227; G01N 21/532; G01N 21/64; G01N 2015/1402

USPC ................................................. 356/432–444
See application file for complete search history.

(56) References Cited

U.S. PATENT DOCUMENTS

| | | | | |
|---|---|---|---|---|
| 5,365,343 A | * | 11/1994 | Knapp | G01N 21/9027 356/239.5 |
| 6,115,119 A | * | 9/2000 | Sieracki | G01N 15/0227 356/337 |
| 2013/0315447 A1 | | 11/2013 | Sieracki et al. | |
| 2014/0309782 A1 | | 10/2014 | Cytonome | |
| 2014/0329265 A1 | * | 11/2014 | Wanders | G01N 15/1468 435/29 |
| 2015/0276576 A1 | | 10/2015 | Cytonome | |
| 2016/0116389 A1 | | 4/2016 | Cooper et al. | |
| 2016/0341654 A1 | * | 11/2016 | Sieracki | G01N 15/1434 |

OTHER PUBLICATIONS

International Search Report and Written Opinion in corresponding PCT application No. PCT/US2019/034590, dated Nov. 1, 2019, 8 pp.

* cited by examiner

*Primary Examiner* — Tri T Ton
(74) *Attorney, Agent, or Firm* — Caseiro Burke LLC; Chris A. Caseiro

(57) ABSTRACT

An imaging flow cytometry system and method which includes a flow chamber, light obscuration analysis and imaging optics, image capturing system, device to regulate fluid flow through the chamber, and backlighting generator. The flow cell is configured so that light obscuration signals can be detected from the same passing particles that are imaged.

14 Claims, 3 Drawing Sheets

SYSTEM AND METHOD FOR LIGHT OBSCURATION ENHANCED IMAGING FLOW CYTOMETRY

FIELD OF THE INVENTION

The present invention relates generally to an optical flow imaging and analysis configuration used in particle analysis instrumentation, and more particularly to an optical flow imaging system and method incorporating an in line light obscuration measurement, enabling more useful particle measurements than previously enabled. This system and method may include other measurements such as particle fluorescence and light scatter.

BACKGROUND OF THE INVENTION

Various optical/flow systems employed for transporting a fluid within an analytical instrument to an imaging and optical analysis area exist in the art. A fluid sample is typically delivered into the bore of a flow chamber and the sample is interrogated in some way to generate analytical information concerning the nature, content or properties of the sample. For example, the system may automatically image the sample as it is flowing through a chamber containing the fluid under analysis.

Automatically imaging passing particles in fluid flow by illuminating the fluid and activating an image capturing device, such as a camera with a frame grabber, at regular intervals, can provide images which contain a lot of information about the particles. However, other measurement techniques can be more useful. One such technique of interest is light obscuration. The light obscuration technique, which is sometimes referred to as single particle optical sensing, involves the back illumination of a fluid, with a laser such that the loss of light due to the particle can be detected by a single photodiode. In some situations, detection of light loss is easier and more accurate than detection by light scatter. Therefore, there is a need in the art for an effective way to provide light obscuration measurements as well.

SUMMARY OF THE INVENTION

It is an object of the present invention to provide an imaging flow cytometry system and method with light obscuration signal data of high integrity.

This and other objects are achieved with the present invention, which enables light obscuration measurements through introduction of a properly dimensioned flow cell which allows imaging of particles and allows illumination of the passing particles with a laser fan generator, which illuminates across all of the flow cell flow area. Further, the light obscuration measurement optics are configured with a photodiode on the flow cell side opposite the laser. The laser fan generator and photodiode may be either at the same location as the imaging objective or may be downstream of the imaging optics after the imaging takes place. As such, the light obscuration optics are able to collect laser light and monitor when a passing particle obscures the laser.

The present invention is a system for imaging particles in a fluid. The system includes a flow chamber, which includes a channel arranged to transport the fluid therethrough at a selectable rate, wherein the flow chamber is configured to enable light obscuration from the fluid within the channel or after it has been imaged, a device configured to create a controllable fluid flow rate in the flow chamber, a backlighting generator arranged to illuminate the fluid in the flow chamber, an objective arranged to receive incident optical radiation from the flow chamber, a light source arranged to generate light obscuration from particles, one or more detectors to detect obscuration or scatter emitted from the particles upon illumination, a signal processor configured to receive signals from the one or more detectors and an image capturing system including means to capture images of particles in the fluid. The backlighting generator may be a light emitting diode flash. The backlighting generator generates a high intensity flash. The system also includes a computing device to receive signals from the image capturing system. The image capturing system includes a digital camera or an analog camera and a framegrabber. The image capturing system also includes a CCD or a CMOS camera. The light source may be a laser. The present invention is also an apparatus to assist in the imaging of particles in a fluid, the apparatus comprising a flow chamber including a channel arranged to transport the fluid therethrough at a selectable rate, wherein the flow chamber is configured to enable fluorescence propagation from the fluid within the channel to an edge of the flow chamber for enhanced light collection of the fluorescence.

The present invention also provides a method for imaging particles in a fluid which is transported through a channel of a flow chamber at a selectable rate and illuminated with a light source so that scatter and/or obscuration signals are detected. The method includes the steps of directing the fluid through the flow chamber, wherein the flow chamber is configured to and imaging the tracked particle and transferring the captured images to a computing device. The method also includes the step of analyzing the image for particles.

The present invention also includes a method for imaging particles in a fluid, which method includes the steps of transporting the fluid through a channel of a flow chamber at a selectable rate, wherein the flow chamber is configured to enable laser illumination from the fluid within the channel to a photodiode and then to a signal processor and, if the signal meets a predetermined threshold, activating a backlighting generator, and activating an image capturing system and imaging particles and transferring the captured images to a computing device. That method further includes the step of analyzing the image for particles. The user may also select to have the image capturing done at a regular interval where the backlighting generator is activated regularly as is the image capturing system which images particles and transfers the captured images to a computing device which then analyzes the image for particles.

These and other advantages of the present invention will become more readily apparent upon review of the following detailed description, the accompanying drawings, and the appended claims.

DETAILED DESCRIPTION OF THE INVENTION

Figure 1:
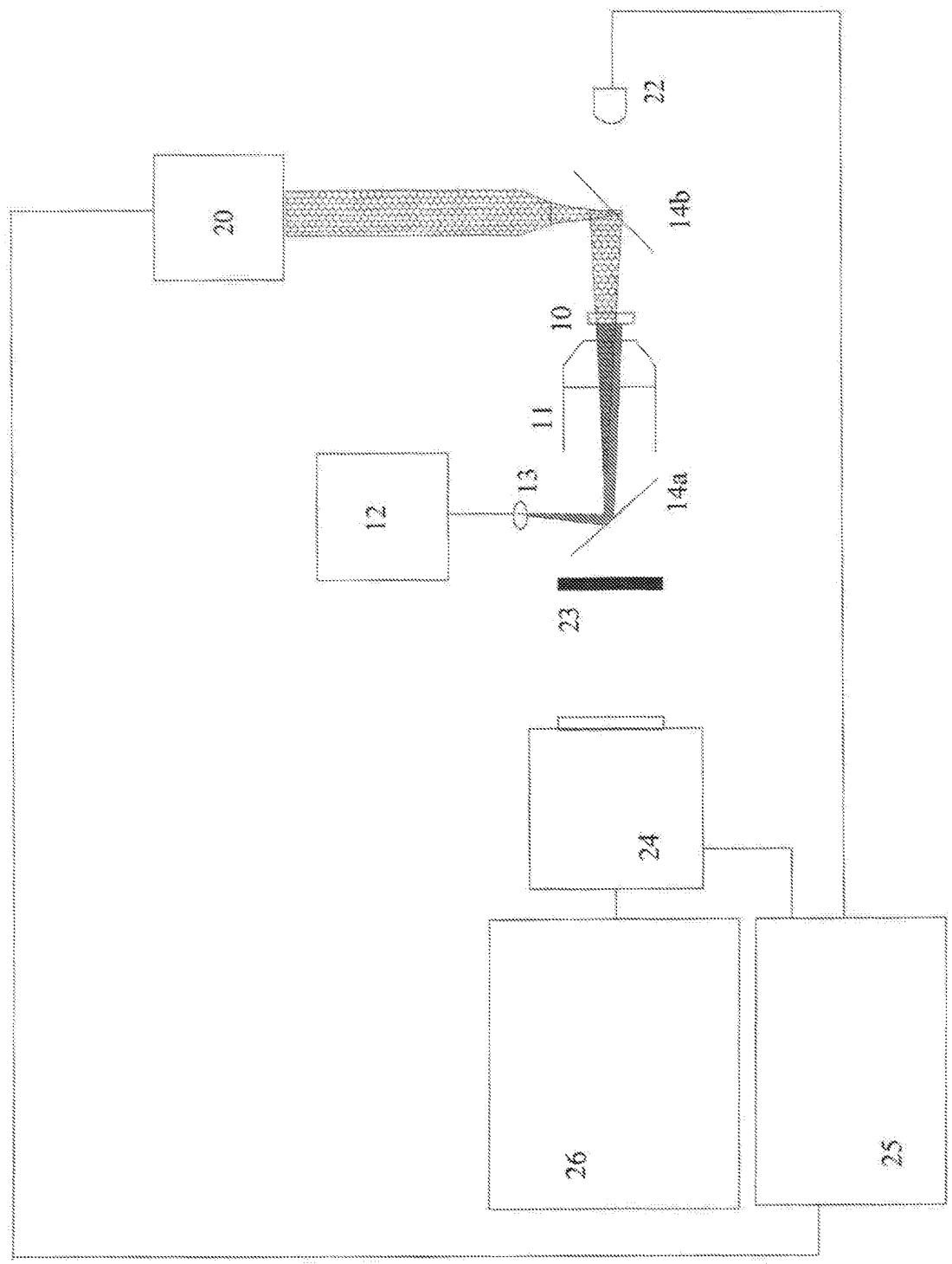
FIG. 1 schematically illustrates an embodiment of a system of the present invention for analyzing particles in a fluid using light obscuration.

A system 100 of the present invention suitable for light obscuration automated counting and/or imaging of particles in a fluid is shown in FIG. 1. The system 100 includes a flow chamber 10, an imaging and excitation objective 11, a light source 12 that may be a laser 12, a laser fan generator lens 13, laser reflecting mirrors 14a and 14b, light obscuration photodiode 20, a backlighting source 22, a laser blocking filter 23, an image capturing system 24, a digital signal processor 25, a computing device 26 and a pump capable of delivering a controllable fluid flow rate. The embodiment of the system 100 depicted in FIG. 1 may also include other imaging components and analysis in other possible configurations such as those described and illustrated in prior patents owned by the applicant.

An inlet of the flow chamber 10 is connectable to a fluid source such as a sample source and an outlet of the flow chamber 10 is connectable to a downstream fluid transfer device for transferring the fluid away from within the flow chamber 10 at a well-controlled, steady and adjustable rate. A suitable example of such a fluid transfer device is the pump, which may be a model 210 programmable syringe pump from KD Scientific, Inc. (Holliston, Mass., US).

The laser 12 is used to generate a light beam that is spread at laser fan generator lens 13 to produce a light pattern that is diverted by mirror 14a through the microscope objective 11 to the flow chamber 10, where it illuminates the contents of the flow chamber 10. The light, which has passed through the flow chamber 10 and is modified by any content of the flow chamber 10 that blocks any portion of the light dispersion, is then diverted by mirror 14b to the light obscuration photodiode 20 for detection of that modified light. The laser 12 may be, but is not limited to, a 473 nanometer (nm), 488 nm or 532 nm solid state model laser available from an array of manufacturers known to those of skill in the art. Any particle light obscuration signals from the flow chamber 10 that have a wavelength of the laser 12 are detected by the light obscuration photodiode 20.

Figure 2:
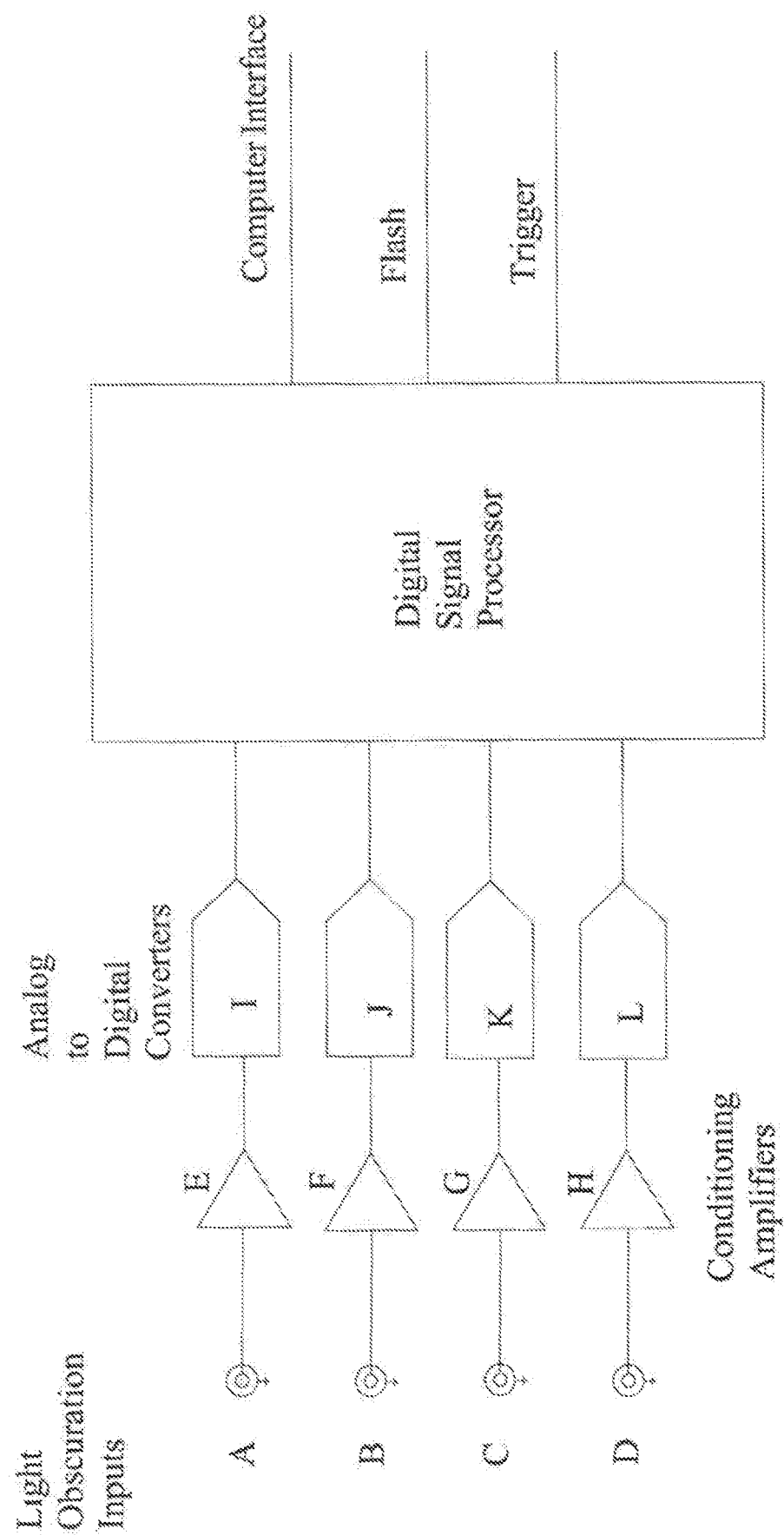
FIG. 2 is a diagram of the inputs and outputs to and from a signal processor used in an embodiment of the invention.

Preferably, the signal processor 25 includes an operator-adjusted threshold setting which can be used to establish the amount of light obscuration to be detected with the photodiode 20 for the present system to acknowledge a passing particle. For example, and in no means limiting the scope of the invention, the operator may set the threshold to be 200 dimensionless obscuration units. With that setting, any light detected by an element of the photodiode 20 that is more than 200 obscuration units relative to the light detected by other elements of the photodiode 20 is flagged as an indicator of particle existence at the corresponding location in the flow chamber 10. That threshold may be adjusted higher or lower as desired, including as a function of the type of particles expected to exist in the fluid. One diagrammatic representation of a form of the signal processor 25 inputs and outputs that can be used in the system 100 and method of the present invention to generate accurate and reliable indications of particle size, shape and quantity in the fluid sample illuminated in the flow chamber 10 is shown in FIG. 2. Obscuration inputs A-D are processed by conditioning amplifiers E-H where they may be amplified and/or converted to their logarithm for better dynamic range as is commonly done in flow cytometers. These signals are then converted to digital signals using converters I-L, which are analyzed by the signal processor 25. Outputs from the signal processor 25 are used to interface with the computing device 26, illumination activation and any backlighting operations of the system 100. Programming of the signal processor 25 determines how it analyzes and reacts to the inputs. It is noted that more or fewer inputs may be used without deviating from the basic premise of the invention. It is also to be noted that the photodiode 20 may be a single detector, such as the Hamamatsu S12497, or it may be a plurality of detectors that effectively divide the region of the flow chamber 10 under analysis into a plurality of sections that are separately observed, with the results of the plurality of detectors analyzed in total.

When an obscuration input from any of inputs A-D to the signal processor 25 is greater than the predetermined selectable threshold established by the operator of the system 100, indicating presence of a particle to be imaged, for example, the signal processor 25 initiates a camera trigger and then a flash signal to the backlighting source 22. The exposure of the camera and resultant imaging overlap the period where the sample is illuminated by the flash.

In the obscuration mode of operation, when an obscuring particle passes through the area illuminated by the light source 12, the particle generates a signal which the signal processor 25 monitors. The signal processor 25 carries out an analysis interval to determine if the signal is strong enough to track, i.e., above the predetermined selectable threshold. If the signal is strong enough as determined during the analysis interval, the signal processor 25 initiates a camera trigger pulse and then a flash signal to the backlighting source 22. The computing device 26 then reads in the resulting image and data regarding the obscuration data. The computing device 26 is programmed to store the information received from the signal processor 25 and to make calculations associated with the particles detected. For example, but not limited thereto, the computing device 26 may be programmed to provide specific information regarding the obscuration of the detected particles, the shape of the particles, dimensions of the particles, and specific features of the particles. The computing device 26 may be any sort of computing system suitable for receiving information, running software on its one or more processors, and producing output of information, including, but not limited to, images and data that may be observed on a user interface. An example of a suitable computing device at the time of the writing of this application is almost any personal computer.

As noted, the signal processor 25 is connected to the backlighting source 22 which, specifically, may be a light emitting diode (LED) or other suitable light generating means that produces a light of sufficient intensity to backlight the flow chamber 10 and image the passing particles. In one embodiment, the backlighting source 22 may be a very high intensity LED flash such as a 670 nm LED flash, or a flash of another suitable wavelength, which is flashed on one side of the flow chamber 10 for 200 μsec (or less). At the same time, the image capturing system 24 positioned on the opposing side of the flow chamber 10 is activated to capture an instantaneous image of the particles in the fluid as "frozen" when the high intensity flash occurs. The image capturing system 24 is arranged to either retain the captured image, transfer it to the computing device 26, or a combination of the two. The image capturing system 24 includes characteristics of a digital camera or an analog camera with a framegrabber or other means for retaining images. For example, but in no way limiting what this particular component of the system may be, the image capturing system 24 may be a CCD firewire, a CCD USB-based camera, a CMOS camera, or other suitable device that can be used to capture images and that further preferably includes intrinsic computing means or that may be coupled to computing device 26 for the purpose of retaining images and to manipulate those images as desired. The computing device 26 may be programmed to measure the size and shape of the particle captured by the image capturing system 24 and/or to store the data for later analysis.

Figure 3:
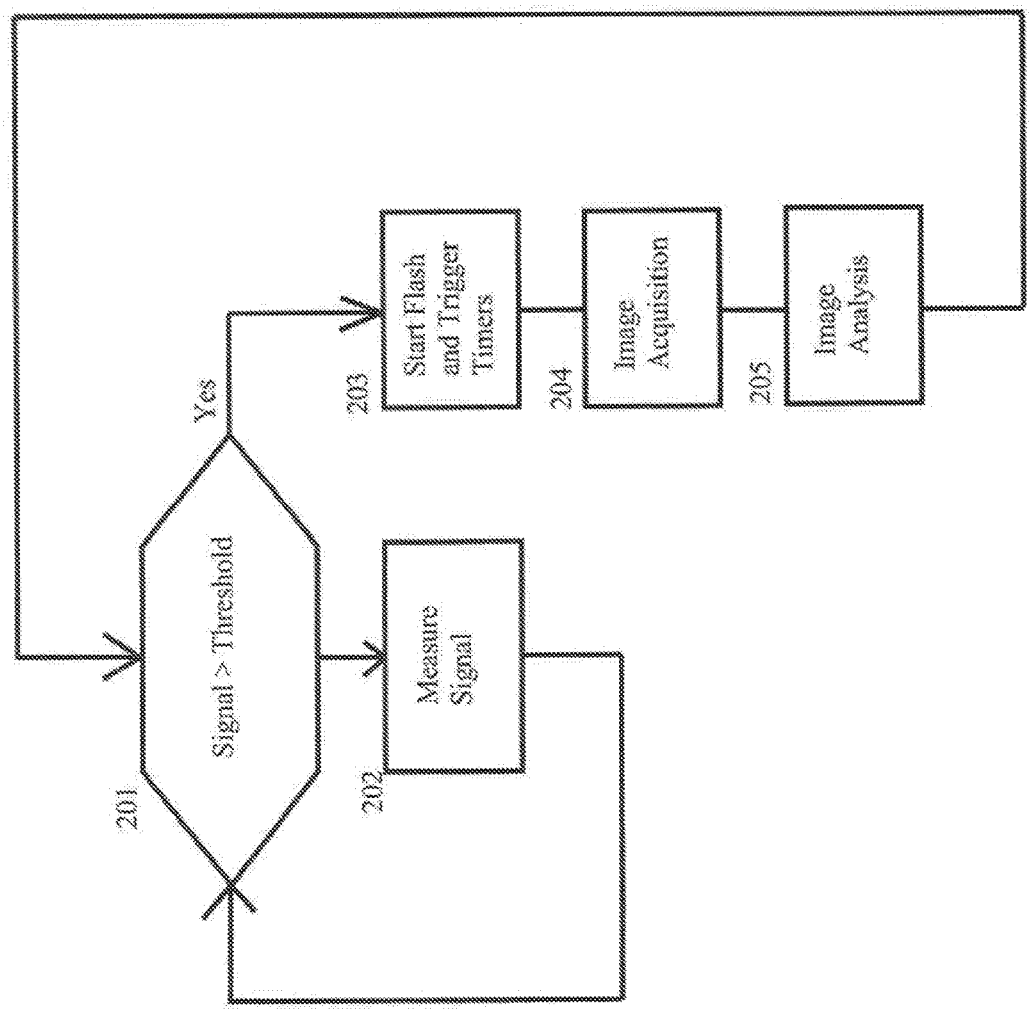
FIG. 3 is a diagram representing the steps of the method of particle detection of the present invention using light obscuration.

As represented in FIG. 3, a method 200 of the present invention includes steps associated with capturing images with the system 100 of the present invention. Several processes occur on a continuous basis during normal operation. For example, in one embodiment, the pump draws the sample through the flow chamber 10 at a constant rate. The flow chamber 10 is illuminated with excitation light from the laser 12 continuously. Finally, the signal processor 25 continuously reads these signals.

In addition to these continuous processes, discrete steps are carried out as part of the method 200 for particle analysis using light obscuration. During step 201, light obscuration signals from the photodiode 20 elements are compared to the predetermined threshold selected by an operator. If the signals are not greater than the threshold, the diode inputs are measured again in step 202. If they are greater than the threshold, the digital signal processor 25 executes step 203, wherein the signal processor 25 activates the image capturing system 24 and flashes the backlight so that the system 100 can capture an image of the passing particle while the high intensity flash occurs. During step 204 of the method of the present invention, the image capturing system 24 transfers the captured image to the computing device 26. During the image analysis step 205, the computing device 26 analyzes the image for particles and if any particles with acceptable characteristics are found, the device 26 stores their images and their light obscuration data and other measurements such as fluorescence and light scatter. That information is used to identify the number, shape and size of the particles in the fluid in the flow chamber with satisfactory accuracy and reliability.

The present invention has been described with respect to a particular embodiment. Nevertheless, it is to be understood that various modifications may be made without departing from the spirit and scope of the invention. All equivalents are deemed to fall within the scope of this description of the invention.

What is claimed is:

1. A system for using light obscuration for imaging of particles in a fluid, the system comprising:
   a. a flow chamber through which the fluid may pass at a controllable fluid flow rate;
   b. a backlighting generator arranged to illuminate the fluid in the flow chamber;
   c. an imaging and excitation objective arranged to receive incident optical radiation from the flow chamber;
   d. a light source used to generate a light beam;
   e. a first mirror arranged to divert the light beam from the light source through the imaging and excitation objective to the flow chamber to illuminate particles in the fluid;
   f. one or more detectors to detect light obscuration by the particles upon illumination;
   g. a second mirror arranged to divert light from the flow chamber modified by any content of the flow chamber to the one or more detectors;
   h. a signal processor configured to receive signals from the one or more detectors, wherein the signal processor includes an operator-adjusted threshold to establish an amount of light obscuration detected by the one or more detectors such that any light detected by the one or more detectors more than the operator-adjusted threshold relative to any other light detected is flagged as an indicator of particle existence in the flow chamber; and
   i. an image capturing system including means to capture images of particles in the fluid based on the signals received from the one or more detectors.

2. The system of claim 1, wherein the backlighting generator is a light emitting diode flash.

3. The system of claim 1, wherein the backlighting generator generates a high intensity flash.

4. The system of claim 1, wherein the system further includes a computing device to receive signals from the image capturing system.

5. The system of claim 1, wherein the image capturing system includes a computing device.

6. The system of claim 1, wherein the image capturing system includes a digital camera or an analog camera and a framegrabber.

7. The system of claim 1, wherein the image capturing system includes a CCD or a CMOS camera.

8. The system of claim 1, wherein the light source is a laser.

9. The system of claim 1, wherein the one or more detectors are photodiodes.

10. A method for imaging particles in a fluid which is transported through a channel of a flow chamber at a selectable rate and illuminated with a light source so that light obscuration signals are detected, the method comprising the steps of:
   a. directing the fluid through a flow chamber, wherein the flow chamber is configured to enable obscuration light signal propagation from the fluid within the channel to a detector;
   b. establishing an operator-adjusted threshold to establish an amount of light obscuration detected by the detector such that any light detected by the detector that is more than the operator-adjusted threshold relative to any other light detected is flagged as an indicator of particle existence in the flow chamber; and
   c. capturing an image of at least a portion of the fluid based on the obscuration light signal propagation and transferring the captured image to a computing device for analysis of content of the at least portion of the fluid.

11. The method of claim 10, wherein the method further includes the step of analyzing the image for particles in the fluid.

12. The method of claim 10, wherein the obscuration light signal propagation is detected with a photodiode.

13. The system of claim 1, wherein the operator-adjusted threshold is 200 dimensionless obscuration units.

14. The method of claim 10, wherein the operator-adjusted threshold is 200 dimensionless obscuration units.

* * * * *